US008738082B2

(12) United States Patent
Angelhag

(10) Patent No.: US 8,738,082 B2
(45) Date of Patent: May 27, 2014

(54) IDENTITY MODULE DEVICE, METHOD AND COMPUTER PROGRAM PRODUCT

(75) Inventor: Anders Angelhag, Lund (SE)

(73) Assignees: Sony Mobile Communications AB, Lund (SE); Sony Corporation, Tokyo (JP)

( * ) Notice: Subject to any disclaimer, the term of this patent is extended or adjusted under 35 U.S.C. 154(b) by 98 days.

(21) Appl. No.: 13/382,946

(22) PCT Filed: Dec. 21, 2010

(86) PCT No.: PCT/EP2010/070402
§ 371 (c)(1),
(2), (4) Date: Jan. 25, 2012

(87) PCT Pub. No.: WO2012/084022
PCT Pub. Date: Jun. 28, 2012

(65) Prior Publication Data
US 2012/0157163 A1 Jun. 21, 2012

(51) Int. Cl.
*H04B 1/38* (2006.01)
(52) U.S. Cl.
USPC .......... 455/558; 455/533.1; 455/552.1; 717/174; 717/176; 717/178
(58) Field of Classification Search
USPC .......... 455/558, 553.1, 552.1; 717/174, 176, 717/178
See application file for complete search history.

(56) References Cited

U.S. PATENT DOCUMENTS

| 5,987,325 | A | 11/1999 | Tayloe | |
|---|---|---|---|---|
| 2008/0064443 | A1* | 3/2008 | Shin et al. | 455/558 |
| 2010/0248782 | A1* | 9/2010 | Cheon | 455/558 |

FOREIGN PATENT DOCUMENTS

DE 199 19 389 A1 11/2000

OTHER PUBLICATIONS

International Search Report and Written Opinion dated Sep. 6, 2011 issued in corresponding PCT application No. PCT/EP2010/070402, 11 pages.
Optiz, Rudolf et al., "Mobilefunk-Windows Das Smartphone Xda Von 02," CT Magazin Fuer Computer Technik, Heise Zeitschriften Verlag, Hannover, Germany, No. 17, Aug. 12, 2002, p. 76.

* cited by examiner

*Primary Examiner* — Tuan Pham
(74) *Attorney, Agent, or Firm* — Snyder, Clark, Lesch & Chung, LLP

(57) ABSTRACT

Device (10) comprising a communication network operator subscriber identity module (SIM) card (12) or a software-based network operator SIM (12) or means for receiving a communication network operator subscriber identity module (SIM) card (12). The device (10) also comprises a device vendor-specific subscriber identity module (SIM) card (16) or a software-based device vendor-specific SIM (16) and a control unit (20) arranged to connect said network operator SIM card (12) and/or said device vendor-specific SIM card (16) or said software-based device vendor-specific SIM (16) to a communication network.

22 Claims, 2 Drawing Sheets

IDENTITY MODULE DEVICE, METHOD AND COMPUTER PROGRAM PRODUCT

TECHNICAL FIELD

The present invention concerns a device comprising a communication network operator Subscriber Identity Module (SIM) card or a software-based network operator SIM, such as a M2M Communication Identity Module (MCIM), or means for receiving a communication network operator SIM card. The present invention also concerns a method and computer program product.

BACKGROUND OF THE INVENTION

In order for a user of a device, such as a mobile telephone, to gain access to a service provided by a network operator, the user needs three things:
- a billing relationship with a network operator whereby services are paid for in advance of them being consumed or where bills are issued and settled after the service has been consumed,
- a device that is compliant to the type of technology the network operator intends to deploy and that operates at the same frequency as the operator, and
- a Subscriber Identity Module (SIM) card that is activated by the network operator once the billing relationship is established.

A SIM card securely stores a service subscriber key that is used to identify a user and allows a user to change device by simply removing the SIM card from one device and inserting it into another. A SIM card usually contains a unique serial number, an internationally unique number of the mobile user (IMSI), security authentication and ciphering information, temporary information related to the local network, a list of the services a user has access to and one or more passwords such as a personal identification number (PIN) and a PIN-unlock key (PUK).

Once a SIM card is loaded into a powered device, it will search for the nearest base station with the strongest signal in the operator's frequency band. The device then identifies itself/its user to the network and once this is successfully completed, the device is attached to the network operator's communication network.

SUMMARY OF THE INVENTION

An object of the invention is to provide an improved device comprising a communication network operator Subscriber Identity Module (SIM) card, such as an insertable network operator SIM card or a software-based network operator SIM card, or means for receiving a communication network operator SIM card, such as a slot or cavity.

This object is achieved by a device that comprises a device vendor-specific Subscriber Identity Module (SIM) card or a software-based device vendor-specific SIM, i.e. a SIM card arranged to allow communication between a communication device vendor and a user of the communication device or the communication device itself, optionally whereby a user or a network operator can not permanently de-activate the vendor-specific SIM card. The device also comprises a control unit arranged to connect the network operator SIM card or software-based network operator SIM card and/or the device vendor-specific SIM card or software-based vendor-specific SIM card to a communication network, i.e. the device is arranged to be able to operate via both SIM cards at the same time, or to operate via one SIM card at a time by switching between the SIM cards. The SIM cards may therefore be arranged to function in parallel using two different radio circuits each having its own antenna or one at a time using the same radio circuit that has just one antenna. The SIM cards may be arranged to operate within either the same frequency band or in different frequency bands. One or both of the SIM cards may for example be operated in one or more of the following frequency ranges: GSM, W-CDMA, TDMA, GPS, Rx diversity, W-LAN, Wi-Fi, Bluetooth, UWB or any other frequency range.

The device according to the present invention therefore comprises at least two SIM cards, or means to receive at least two SIM cards, one of which is arranged to communicate with a network operator, i.e. a company that owns a network of base stations and that provides services for subscribers, on demand and the other one of which is arranged to always be able to communicate with the device vendor or with another party/other parties under the control of the device vendor, e.g. the company or companies that manufacture(s) and/or sell(s) the device or the company or companies approved thereby.

The device according to the present invention allows a device vendor to communicate directly with a user of one of its devices or with a device itself, optionally free of charge, without a user having to use the services of a network operator. A device vendor may thereby ensure that a device is working properly and that any detected problems are remedied quickly, and that all users of their device have an open line of communication with the device vendor. When a person buys such a device he/she will immediately gain access to the device vendor's services without (direct) network operator involvement.

According to an embodiment of the invention the device comprises a control unit arranged to temporarily or periodically de-activate the network operator SIM card or software-based network operator SIM card or the means for receiving the network operator SIM card (by locking the means for receiving the network operator SIM card for example so that a network operator SIM card cannot be inserted and/or an already inserted network operator SIM card cannot be removed), upon receiving a deactivate signal via said vendor-specific SIM card or software-based vendor-specific SIM card for example, so that a service may preferentially be provided by a device vendor rather than by a network operator for example. The device vendor-specific SIM card or software-based vendor-specific SIM card may therefore be prioritized.

According to another embodiment of the invention the control unit is arranged to permanently de-activate the network operator SIM card or software-based network operator SIM card (or all of the network operator SIM card or software-based network operator SIM cards of the device) and/or the means for receiving the communication network operator subscriber identity module (SIM) card (or all of the means for receiving network operator SIM cards), upon receiving a deactivate signal via said vendor-specific SIM card or software-based vendor-specific SIM card for example. If a device is lost or stolen, the device vendor can permanently de-activate the device's network operator SIM card or software-based network operator SIM card(s), by sending a control signal to the control unit of the device for example, whereby the device will be of very little, if any use to any party handling the lost/stolen device, which thereby makes the device much less attractive to steal.

It should be noted that the expression "de-activate a network operator SIM card or software-based network operator SIM card" is intended to mean rendering a network operator SIM card or software-based network operator SIM card unable to communicate with a network operator or any other communication network by mechanical or electrical means for example. The expression "permanently de-activate" as used in this document is intended to mean that the network operator SIM card or software-based network operator SIM card(s) is/are de-activated permanently or until a lost/stolen device is returned to its rightful owner.

For example, the device according to an embodiment of the invention may be arranged to comprise a lock to prevent the usage of a cavity/slot for a network operator SIM card or software-based network operator SIM card and/or to cause the vendor-specific SIM card or software-based vendor-specific SIM card to communicate the device's location and identity of any inserted network operator SIM card or software-based network operator SIM card to the device vendor. The vendor-specific SIM card or software-based vendor-specific SIM card may be arranged to subsequently unlock the cavity/slot for a network operator SIM card or software-based network operator SIM card.

According to an embodiment of the invention the device vendor may act as a virtual network operator, i.e. a company that does not own a network of base stations but lease it instead from a network operator in a particular country/region.

According to a further embodiment of the invention the software-based vendor-specific SIM card is an M2M Communication Identity Module (MCIM), i.e. a downloadable SIM card, or SoftSIM. According to an embodiment of the invention the device vendor-specific SIM card or software-based vendor-specific SIM card is an integral part of the device, i.e. it is provided in the device on manufacture of the device and it cannot easily be removed from the device.

According to an embodiment of the invention the control unit is arranged to allow the device vendor-specific SIM card or software-based vendor-specific SIM card to function when the device is not in use (during the night for example), and/or when particular software or a particular application is de-activated or activated, and/or on demand/approval of a user. For example, device vendor-specific SIM card or software-based vendor-specific SIM card may be arranged to run one or more services when a user of the device is asleep.

According to another embodiment of the invention the device vendor-specific SIM card or software-based vendor-specific SIM card is arranged to provide at least one service, such as a device vendor specific service, to a user of the device. Typical services may include voice calls, data transmission, short message service (SMS), personal information manager (PIM) services, tracking services, applications and/or device software/hardware testing.

According to a further embodiment of the invention the device vendor-specific SIM card or software-based vendor-specific SIM card is arranged to collect data concerning the device's software, hardware or usage problems, whereby maintenance and repair work may be carried out automatically without user involvement or whereby a user may be notified if maintenance or repair work has to be carried out on his/her device.

According to an embodiment of the invention the device vendor-specific SIM card or software-based vendor-specific SIM card is arranged to collect feedback from a user of the device, i.e. any comments/questions concerning available services, the device, the device vendor, customer opinions, invoice queries etc.

According to another embodiment of the invention the device comprises a communication device, telephone, media player, Personal Communications System (PCS) terminal, Personal Data Assistant (PDA), laptop computer, palmtop receiver, camera, television, radar and/or any appliance that includes a transducer designed to transmit and/or receive radio, television, microwave, telephone and/or radar signals. The device according to the present invention is however intended for use particularly, but not exclusively for high frequency radio equipment. For example, both of a device's SIM cards may be arranged to utilize the same radio frequency band, or different radio frequency bands.

The present invention also concerns a method for ensuring that a device vendor is able to communicate with a device comprising a communication network operator SIM card or software-based network operator SIM card or means for receiving a communication network operator SIM card. The method comprises the steps of providing the device with a device vendor-specific SIM card or software-based vendor-specific SIM card, for example a software-based SIM, such as a M2M Communication Identity Module (MCIM) or Soft-SIM, and a control unit arranged to connect the network operator SIM card or software-based network operator SIM card and/or the device vendor-specific SIM card or software-based vendor-specific SIM card to a communication network. The method enables a device to operate via both SIM cards at the same time using two different radio circuits, or to operate via one SIM card at a time using the same radio circuit and switching between the SIM cards. Embodiments of the method are recited in the accompanying dependent method claims.

The present invention also concerns a computer program product that comprises a computer program containing computer program code means arranged to cause a computer or a processor to execute the steps of a method according to any of the embodiments of the invention, stored on a computer-readable medium or a carrier wave.

BRIEF DESCRIPTION OF THE DRAWINGS

The present invention will hereinafter be further explained by means of non-limiting examples with reference to the appended schematic figures where.

It should be noted that the drawings have not necessarily been drawn to scale and that the dimensions of certain features may have been exaggerated for the sake of clarity.

DETAILED DESCRIPTION OF EMBODIMENTS

Figure 1:
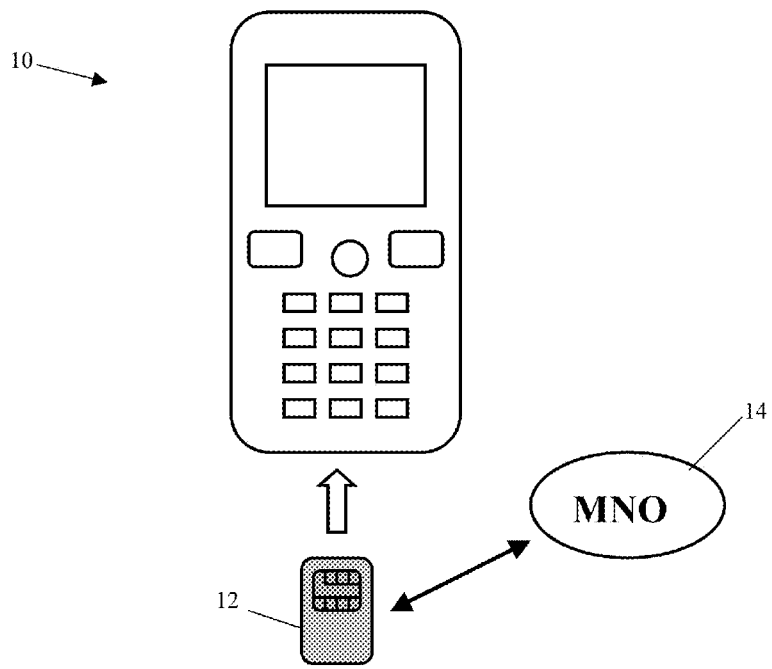
FIGS. 1 & 2 show a device according to an embodiment of the invention.

FIG. 1 shows a device 10, namely a mobile telephone, according to an embodiment of the invention. The device 10 comprises a slot/cavity (not shown) for receiving a communication network operator SIM card 12, such as an M2M Communication Identity Module (MCIM) or SoftSIM, for communicating with a network operator, such as a mobile network operator (MNO) 14.

Figure 2:
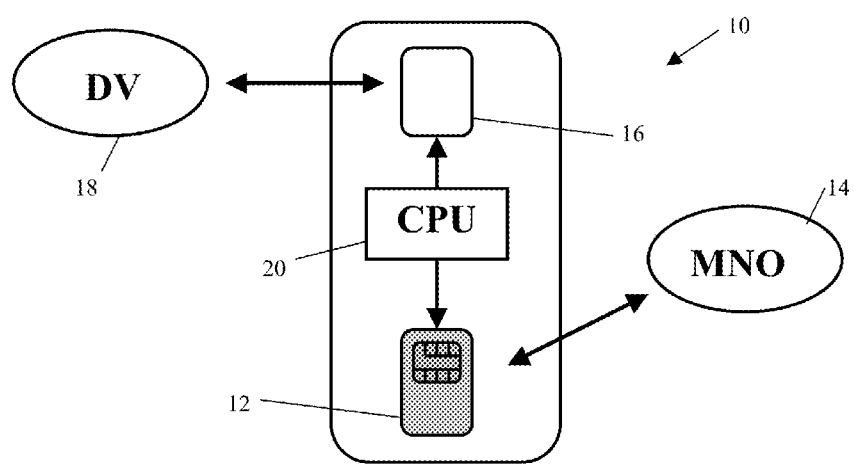

FIG. 2 shows that the device 10 also comprises a device vendor-specific SIM card 16, such as an M2M Communication Identity Module (MCIM) or SoftSIM, integrated into the device software and/or hardware, for communicating with a device vendor DV 18. The device 10 comprises a control unit 20, such as a central processing unit CPU, arranged to connect the network operator SIM card 12 and the device vendor-specific SIM card 16 to a communication network one at a time or at the same time. The device vendor specific SIM card 16 may be arranged to collect data or feedback concerning the device's software, hardware or use, and optionally to transmit such data/feedback to the device vendor (DV) 18. Alternatively, such data or feedback may be stored in the device 10. Furthermore, the device vendor (DV) 18 may provide a user of the device 10 with information, such as information concerning an available service or product for example. Such transmissions may occur continuously, periodically or on demand/approval of the user. A control unit 20 may be arranged to de-activate the network operator SIM card 12 and/or the means for receiving the communication network operator SIM card 12, at night upon receiving a deactivate signal via said vendor-specific SIM card and activate the device vendor-specific SIM card 16 for example so that services may be run while the user is asleep.

One or both of the SIM cards 12, 16 may be a software-based SIM card. The SIM cards 12, 16 may be arranged to (simultaneously or non-simultaneously) transmit and/or receive signals using the same radio circuit or two different radio circuits. The device 10 may comprise circuitry to enable a user to switch between different SIM cards and/or select the frequency band of transmitted and/or received signals and the number of communication channels in use.

The control unit 20 may be arranged to de-activate the network operator SIM card 12, so that a service may preferentially be provided by a device vendor DV rather than by a network operator MNO for example.

According to an embodiment of the invention the control unit 20 is arranged to permanently de-activate the network operator SIM card 12 or the means for receiving the network operator SIM card in the event a user reports that his/her device 10 has been lost or stolen.

The device 10 according to the present invention may be any device, such as a communication device, telephone, media player, Personal Communications System (PCS) terminal, Personal Data Assistant (PDA), laptop computer, palmtop receiver, camera, television, radar and/or any appliance that includes a transducer designed to transmit and/or receive radio, television, microwave, telephone and/or radar signals.

Figure 3:
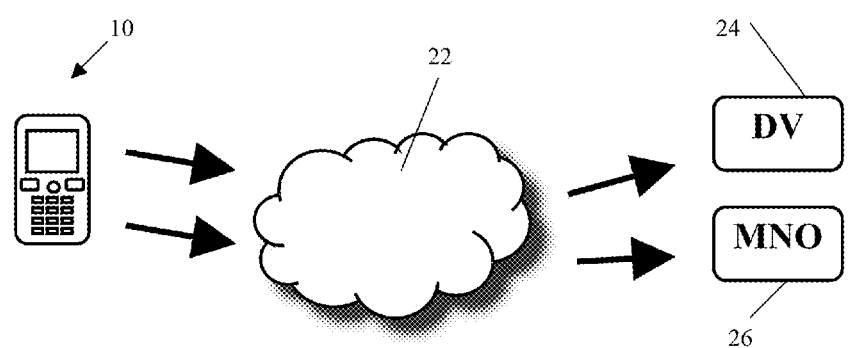
FIG. 3 shows a method according to an embodiment of the invention.

FIG. 3 shows a device according to the present invention which comprises an M2M Communication Identity Module (MCIM), for communicating with a network operator, such as a mobile network operator (MNO) and an M2M Communication Identity Module (MCIM), for communicating with a device vendor. Each MCIM or SoftSIM is arranged to utilize the same radio circuit, or different radio circuits and the same communication network 22 for example. The device vendor specific MCIM communicates with one of the device vendor's servers 24. The network operator MCIM communicates with one of the network operator's servers 26.

The present invention also concerns a computer program product that comprises a computer program containing computer program code means arranged to cause a computer or a processor to execute the steps of a method according to any of the embodiments of the invention.

Further modifications of the invention within the scope of the claims would be apparent to a skilled person.

The invention claimed is:

1. A device comprising a communication network operator subscriber identity module (SIM) card or a software-based network operator SIM, or means for receiving a communication network operator SIM card, wherein said device comprises a device vendor-specific SIM card or a software-based device vendor-specific SIM, and a control unit arranged to connect said network operator SIM card or said software-based network operator SIM or said device vendor-specific SIM card or said software-based device vendor-specific SIM to a communication network, wherein said device comprises a control unit arranged to de-activate said network operator SIM card or said software-based network operator SIM or means for receiving said communication network operator SIM card, upon receiving a deactivate signal via said vendor-specific SIM card or a software-based device vendor-specific SIM.

2. The device according to claim 1, wherein said control unit is arranged to permanently de-activate said network operator SIM card or said software-based network operator SIM.

3. The device according to claim 1, wherein said device vendor-specific SIM card or said software-based device vendor-specific SIM is an integral part of said device.

4. The device according to claim 1, wherein said control unit is arranged to allow said device vendor-specific SIM card or said software-based device vendor-specific SIM to function when said device is not in use, or when particular software or a particular application is de-activated or activated, or on demand/approval.

5. The device according to claim 1, wherein said device vendor-specific SIM card or said software-based device vendor-specific SIM is arranged to provide at least one service to a user of said device.

6. The device according to claim 1, wherein said device vendor-specific SIM card or said software-based device vendor-specific SIM is arranged to collect data concerning said device's software or hardware problems or usage from said device.

7. The device according to claim 1, further comprising a communication device, telephone, media player, Personal Communications System (PCS) terminal, Personal Data Assistant (PDA), laptop computer, palmtop receiver, camera, television, radar or any appliance that includes a transducer designed to transmit or receive radio, television, microwave, telephone or radar signals.

8. The device according to claim 1, wherein said communication network operator SIM card or said software-based network operator SIM and said device vendor-specific SIM card or said software-based device vendor-specific SIM are arranged to utilize the same radio circuit.

9. The device according to claim 1, wherein said communication network operator SIM card or said software-based network operator SIM and said device vendor-specific SIM card or said software-based device vendor-specific SIM are arranged to utilize different radio circuits.

10. A method for ensuring that a device vendor is able to communicate with a device comprising a communication network operator subscriber identity module (SIM) card or a software-based network operator SIM or means for receiving a communication network operator SIM card, the method comprising:
providing said device with a non-deactivateable device vendor-specific SIM card or said software-based device vendor-specific SIM and a control unit arranged to connect said network operator SIM card or said software-based network operator SIM or said device vendor-specific SIM card or said software-based device vendor-specific SIM to a communication network; and
providing the device with a control unit arranged to de-activate said network operator SIM card or said software-based network operator SIM or means for receiving said communication network operator SIM card, upon receiving a deactivate signal via said vendor-specific SIM card or said software-based device vendor-specific SIM.

11. The method according to claim 10, further comprising providing said device with a control unit that is arranged to permanently de-activate said network operator SIM card or said software-based network operator SIM or a software-based device vendor-specific SIM.

12. The method according to claim 10, further comprising providing said device vendor-specific SIM card or said software-based device vendor-specific SIM as an integral part of said device.

13. The method according to claim 11, further comprising providing said device with a control unit that is arranged to allow said device vendor-specific SIM card or said software-based device vendor-specific SIM to function when said device is not in use, or when particular software or a particular application is de-activated or activated, or on demand/approval.

14. The method according to claim 10, further comprising providing, by the device vendor, at least one service to a user of said device.

15. The method according to claim 11, further comprising collecting, by the device vendor, data concerning said device's software or hardware problems or usage from said device.

16. The method according to claim 11, further comprising collecting, by the device vendor, feedback from a user of said device.

17. The method according to claim 11, wherein said device comprises a communication device, telephone, media player, Personal Communications System (PCS) terminal, Personal Data Assistant (PDA), laptop computer, palmtop receiver, camera, television, radar or any appliance that includes a transducer designed to transmit or receive radio, television, microwave, telephone or radar signals.

18. The method according to claim 11, further comprising utilizing the same radio circuit by said communication network operator SIM card or said software-based network operator SIM and said device vendor-specific SIM card or said software-based device vendor-specific SIM.

19. The method according to claim 11, further comprising utilizing different radio circuits by said communication network operator SIM card or said software-based network operator SIM and said device vendor-specific SIM card or said software-based device vendor-specific SIM.

20. The device according to claim 1, wherein said device comprises the control unit arranged to de-activate said network operator SIM card or said software-based network operator SIM and the means for receiving said communication network operator SIM card, upon receiving the deactivate signal via said vendor-specific SIM card or the software-based device vendor-specific SIM.

21. The device according to claim 20, further comprising:
the network operator SIM card or the software-based network operator SIM, and the device vendor-specific SIM card or the software-based device vendor-specific SIM; and
wherein the control unit is arranged to connect the network operator SIM card or the software-based network operator SIM and the device vendor-specific SIM card or the software-based device vendor-specific SIM to the communication network.

22. The method according to claim 11, further comprising providing the device with the control unit arranged to de-activate said network operator SIM card or said software-based network operator SIM and the means for receiving said communication network operator SIM card, upon receiving the deactivate signal via said vendor-specific SIM card or said software-based device vendor-specific SIM.

* * * * *